March 24, 1931.  A. E. JERRAM  1,798,021
POWER DRIVEN LAWN MOWER
Filed Jan. 20, 1928
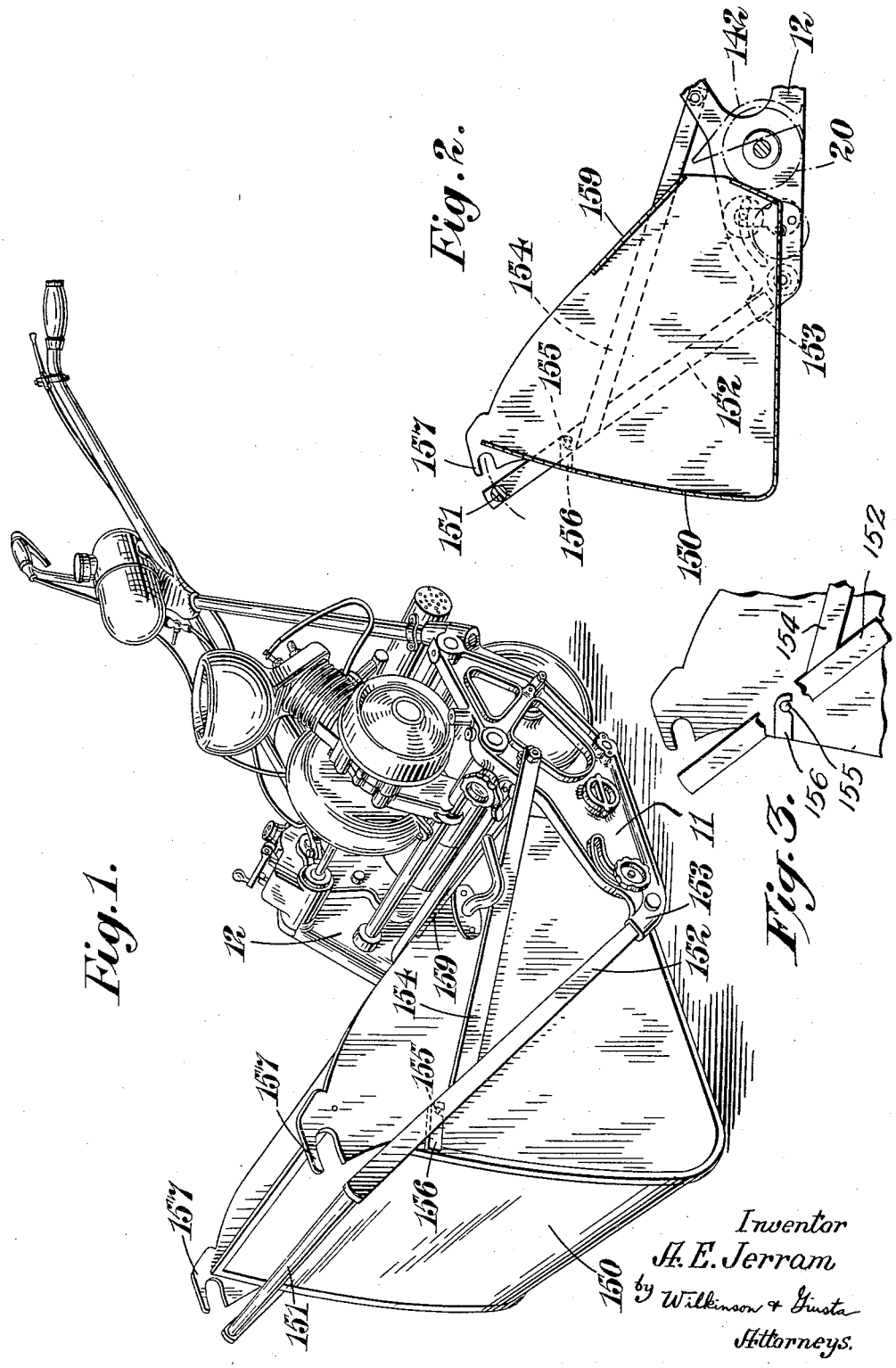
Inventor
A. E. Jerram
by Wilkinson & Giusta
Attorneys.

Patented Mar. 24, 1931

1,798,021

UNITED STATES PATENT OFFICE

ARTHUR ERNEST JERRAM, OF OADBY, ENGLAND

POWER-DRIVEN LAWN MOWER

Original application filed March 23, 1927, Serial No. 177,791, and in Great Britain May 25, 1926. Divided and this application filed January 20, 1928. Serial No. 248,197.

This invention relates to power-driven lawn-mowers. Such machines comprise a grass-collecting box which is usually of large size and relatively heavy to move when filled with grass cuttings. Such machines are shown, for instance, in my U. S. Patent No. 1,709,791, granted April 16, 1929, on application Serial Number 177,791, filed March 23, 1927, and entitled "Power driven lawn mowers," of which the present application is a division.

Various proposals have heretofore been made to mount the grass-box of a lawn-mower so that when emptying the same it was swung first about one axis of pivoting and then about a second axis of pivoting without being removed from the machine, but in all these cases the arrangement was such that the grass-cuttings had to be emptied on to the ground. Such cuttings then had to be filled by manual labour into a wheelbarrow or the like to be conveyed away.

This invention has for its main object to obviate this defect and generally to improve the mounting of and facilitate the emptying of the grass-boxes of power-driven lawn-mowers, so that the grass-cuttings can be delivered directly from the mower into a wheelbarrow or the like for conveying them away.

According to an important feature of the invention, there is provided in or for a power-unit-driven lawn-mower, a supporting-device for a grass-box so arranged to control the emptying motion of the box that this motion is first in one direction and finally bodily in another and different direction away from the power-unit of the machine, the arrangement being such that the grass-cuttings can be discharged from the box into an ordinary wheelbarrow or like receptacle situated in front of the machine, without removing the box from its support.

According to another important feature of the invention, the support for the grass-box has an elevated axis of pivoting for the box, which axis is situated at such a height and the grass-box is so constructed and arranged that it can be swung about the axis for discharging its contents in the manner set forth in the preceding paragraph.

In a convenient construction of support according to the invention, the support has a lower axis of pivoting on which the box is normally supported, and which is situated below the elevated axis aforesaid and is so arranged that when the box is swung in the direction for emptying it, it rotates first about the lower axis and then automatically engages the higher pivotal axis about which it continues to swing on leaving the lower pivotal axis.

One embodiment of the invention is diagrammatically illustrated by way of example in the accompanying drawing, wherein:—

Figure 1 is a perspective view of a power-driven lawn-mower provided with a grass-box supporting device according to the invention, Figure 2 is a sectional side elevation of the said supporting device, and Figure 3 is a side elevation with parts broken away showing the lower pivotal support for the grass box.

Like reference numerals designate like parts in both views.

Referring to the drawing, a supporting device for a grass-box 150 of a lawn-mower comprises a member of inverted U-shape whereof the end cross bar 151 is tubular and constitutes the aforesaid elevated axis of pivoting, and the free ends of the side limbs 152 are detachably carried in sockets 153 on the side members 11, 12 of the mower frame. Two tie rods 154, one for each side limb 152, serve to brace the latter to the mower frame. The lower pivotal axis is constituted by two pivot-pins provided one on each side limb 152 at 155, and the grass-box is provided on either side with a slotted metal plate 156 for engaging the pivots 155. One or more bearing members are provided on the box for engaging the cross bar 151 and permitting the box to swing about the same. As illustrated, these bearing members are in the form of hooks 157 formed by slotting the sides of the box. When the grass-box is in its lowest normal position for receiving the grass cuttings it is supported by the pivots 155 and by rests, one on each side member 11, 12 of the frame of the 1 mower, and the hooks 157 are swung clear of the upper pivot 151. When it is desired to empty the box the front of the box as viewed from the handles of the machine can be readily swung upwards about the lower pivots 155 until the hooks 157 engage the upper pivot 151, whereupon the fulcrum point of the box is transferred to the latter, and the box can be readily swung upwards still further to enable the grass cuttings to be tipped into a wheelbarrow or other receptacle placed to receive them in front of the machine. This arrangement permits the front end of the box to move in a nearly vertical direction until it is clear of the adjacent parts of the machine, so that the total length of the machine can be kept within reasonable dimensions for a grass-box of large capacity.

In order that the grass-box may be of strong yet light construction it is preferably provided with a stretcher plate 159 bridging across its front end and so arranged as to form a forwardly- and upwardly-directed virtual extension of the grass deflector 142 adjacent to the rotary cutter 20. This virtual extension of the deflector plate also ensures that no grass shall be blown backwards into the machinery of the mower. The extension plate 159 conveniently terminates about half way up the front of the box, so that the opening which is left beyond it at the upper end of the box forms the outlet through which the grass cuttings are emptied.

Various modifications may be made in the details of constructions set forth above without departing from the scope of the invention as defined in the claims.

I claim:

1. In a lawn-mower, a grass box, a fulcrum on the lawn-mower for pivotally holding the grass box, said lawn-mower having a second normally disconnected fulcrum for the box situated at an elevation above the first mentioned fulcrum.

2. In a lawn-mower, a grass box and a support for the grass box having two fulcrums one above the other for detachably pivotally supporting the grass box, the upper of said fulcrums being normally disengaged from the box.

3. In a lawn-mower, a support having two fulcrums, one above the other, and a grass box having open bearings for normally engaging the lower fulcrums for normally supporting the box for swinging movement, said box also having upper open bearings normally disconnected from the upper fulcrum, but adapted to engage same on an initial swinging of the box about the lower fulcrum, whereupon said box is adapted to swing about the upper fulcrum while the first named bearings move away from the lower fulcrum.

4. In a lawn-mower, a support, a grass box fulcrumed in said support, a grass deflector on the lawn-mower adjacent said box, and a stretcher plate extending partially over the open side of the box and in line with said glass deflector and having one end closely adjacent to said grass deflector, said box having the grass receiving opening at one side of said stretcher plate and a grass discharge opening at the opposite side of said plate.

In testimony whereof I affix my signature.

ARTHUR ERNEST JERRAM.